DIGITAL-ANALOG FOUR-QUADRANT MULTIPLIER NETWORK

Filed Aug. 24, 1966 3 Sheets-Sheet 1

INVENTORS
PIERRE E. SCHMID
DAVID J. NOWAK

BY Thomas C. Schatzel

DIGITAL-ANALOG FOUR-QUADRANT MULTIPLIER NETWORK

Filed Aug. 24, 1966 3 Sheets-Sheet 2

INVENTORS
PIERRE E. SCHMID
DAVID J. NOWAK

BY Thomas C. Schatzel

DIGITAL-ANALOG FOUR-QUADRANT MULTIPLIER NETWORK

Filed Aug. 24, 1966 3 Sheets-Sheet 3

| CODED BINARY SEQUENCE A B C | $E_0$ LEVEL |
|---|---|
| 0 0 0 | 7 |
| 0 0 1 | 6 |
| 0 1 0 | 5 |
| 0 1 1 | 4 |
| 1 0 0 | 3 |
| 1 0 1 | 2 |
| 1 1 0 | 1 |
| 1 1 1 | 0 |

INVENTORS
PIERRE E. SCHMID
DAVID J. NOWAK

BY Thomas E. Schatzel 3,469,080

DIGITAL-ANALOG FOUR-QUADRANT MULTIPLIER NETWORK

Pierre E. Schmid, Whitefish Bay, and David J. Nowak, West Allis, Wis., assignors to Allen-Bradley Company, Milwaukee, Wis., a corporation of Wisconsin Filed Aug. 24, 1966, Ser. No. 574,795
Int. Cl. G06j *1/02;* G06g *7/16*
U.S. Cl. 235—150.52 9 Claims

ABSTRACT OF THE DISCLOSURE

The invention shown is a digital-analog, four quadrant multiplier network that receives a first input signal in the form of a continuous analog signal of either polarity, which signal can be a steady state value as well as a continuously varying value, and a second input signal in the form of a digital signal that comprises a set of bits of information, the make-up of the set changing for each change in the digital signal. An operational amplifier is provided that has a pair of input terminals and the incoming analog signal is fed through a resistance to the inverting input terminal. A voltage dividing network is connected between the input of the analog signal and the second input terminal of the operational amplifier, which network has a plurality of electronic switches that control the voltage applied to said second amplifier input terminal. The electronic switches, in turn, are controlled by the set of digital information, so that the voltage applied to the second input terminal of the amplifier represents a multiplication of the two input signals, i.e. analog and digital. A feedback resistor is placed across the output of the amplifier and its inverting input terminal, and the output of the amplifier then corresponds in both sign and magnitude to a multiplication of the two input signals.

The present trend in data transmission systems is to rely on integrated and miniaturized circuits. To meet this trend, "hybrid" computer arrangements are desirable wherein digital and analog circuit techniques are utilized in combination. One application for such a "hybrid" arrangement is in digital data transmission systems utilizing the principles of orthogonality wherein a plurality of individual information-carrying, orthogonal signals, e.g. $f_1(t) \ldots f_j(t), f_k(t) \ldots f_n(t)$ are transmitted simultaneously or sequentially, following certain coding rules, over a common transmission medium. According to the principles of orthogonality the integral over a time period of orthogonality, T, of the product of any two of the signals $$\left(\int_0^T f_j(t) f_k(t)\,dt\right)$$

equals zero when the function indices $j$, $k$ are not equal, and equal non zero when the indices $j$ and $k$ are equal. In such data transmission systems, various individual signals may be generated at the transmitter by a digital-analog multiplier of the present invention. The signals may be modulated and transmitted over the channel medium as a composite signal or sequentially. At the receiver, the information carrying signal is fed into a bank of parallel cross-correlators. In each correlator the received signal is multiplied by the reference carrier wave-form for that channel and the product is integrated over each time period T. As a result of the principles of orthogonality when the incoming signal matches a generated reference signal, a signal is produced, but for all incoming signals other than the matching signal no signal is produced. In these applications, it is advantageous that the correlators be of the four-quadrant, multiplier type since the analog and reference signals may be either positive or negative.

Prior art networks generating orthogonal, continuous functions, e.g. sine or cosine, commonly utilize oscillator networks comprising capacitive, inductive and resistive components. Such oscillators are difficult to continuously synchronize and do not readily lend themselves to circuit miniaturization, especially where inductive devices are used. The multiplier of the present invention offers improvements over these limitations.

The present invention provides a "hybrid" type of four-quadrant multiplier whereby a symmetrical output signal ($E_o$) may be realized with only a single amplifier. The output signal $E_o$ can take any of numerous shapes, be attenuated or reversed in polarity by selecting the proper digital sequence or code. The network incorporates an operational amplifier and receives an analog input voltage signal ($E_a$) consisting of either a continuous direct current or alternating current signal. The amplifier has a feedback resistance path ($R_{fb}$) extending between one input terminal and one output terminal. Also, an input resistance path ($R_{in}$) extends from the amplifier input to the source providing the continuous analog input signal $E_a$. Connected to the other input terminal of the amplifier is a weighted array of voltage-dividing networks, switched in accordance with the digital sequence representative of the second input signals, i.e. the "multiplier." The switching circuits of the network are each weighted so that each contributes a unique portion of the input voltage $E_a$ to the input voltage ($E_f$) of the operational amplifier. Thus, the input voltage $E_f$ is dependent upon the individual and collective conductive states of the various switches. The number of dividers is dependent upon the number of unique levels desired for the output signal. The number of possible levels is equivalent to $2^n$ where $n$ is the number of parallel switching circuits. For example, three switching circuits may be incorporated in parallel to provide a maximum of eight unique levels of voltage division, four switching circuits for sixteen levels, five switching circuits for thirty-two levels, etc. As such, the first input analog signal is received by the operational amplifier at the negative terminal and at the same time, the second, weighted signal $E_f$ is received at the positive input terminal. The output voltage signal $E_o$ takes $$E_o = \frac{-R_{fb}}{R_{in}} E_a + E_f \left(\frac{R_{fb}}{R_{in}} + 1\right)$$

To further illustrate, by feeding in an analog D.C. signal, which is a constant in time, an output signal $E_o$, symmetrical about zero, may be generated with the frequency dependent on the repetition rate of the digital pulses and the amplitude dependent on the pulse combination as well as on the input D.C. level. Thus, when operating with D.C. input signal, the circuit performs as a digital-to-analog converter.

Where a plurality of independent symmetrical signals of various frequencies are needed, e.g. as is required by data; transmission systems utilizing orthogonal functions, a plurality of digital-to-analog multipliers are included and the digital sequence for each multiplier is altered to coincide with the desired frequency. Since digital methods are used, synchronization between the various signals is easily assured. In applications, such as data transmission systems, where sinusoidal waveforms are desired, though the signals take the form of step-function approximations, by proper sequence and level selection the waves may be close enough to an ideal waveform that the power of the harmonics can be ignored. This alleviates the need of additional filters. The switches may take the form of mechanical or electronic switches depending upon economics and the space and speed requirements.

The present invention is a versatile circuit which may be used in various applications in addition to digital-to-analog conversion as mentioned above. For example, it may also serve as a modulator. In a modulator application, the continuous analog signal, the "multiplicand," is the A.C. carrier. The digital sequences are determined by the modulating signal, the "multiplier." The output is a double-sideband, amplitude-modulated signal with a step-function envelope carrying the desired information. Further, the digital-to-analog converter may also be used as the reference source for a comparator in an analog-to-digital converter.

Figure 1:
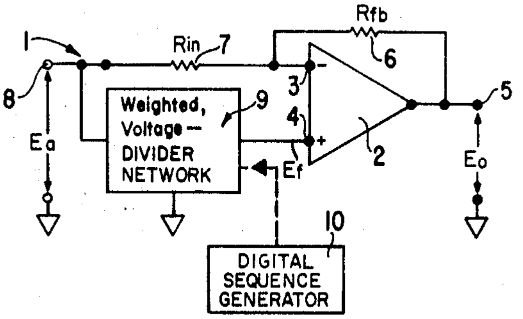
FIG. 1 is a wiring diagram of a digital-to-analog, four-quadrant multiplier of the present invention with the digitally-controlled, voltage divider network represented in block form.

Referring more specifically to the drawings, FIG. 1 illustrates in block diagram form, a digital-analog, four-quadrant multiplier network referred to by the general reference character 1. The multiplier 1 includes an operational amplifier 2 having a pair of input terminals 3 and 4 with the terminal 3 designated as the inverting input to the operational amplifier, and terminal 4 as the non-inverting input. The amplifier 2 also has an output terminal 5 such that the output $E_o$ appears across the terminal 5 and a ground reference plane. Extending between the input terminal 3 and the output terminal 5 is a feedback resistance path $R_{fb}$ illustrated by a parallel feedback resistor 6. Also joining the input terminal 3 is an input resistance $R_{in}$ in the form of an input resistor 7. The other side of the input resistor 7 joins a terminal 8 which serves in part as an input terminal means for the multiplier network 1. Across the terminal 8 and the ground plane is received a continuous analog voltage $E_a$. Extending between the amplifier positive input terminal 4 and the multiplier network input terminal 8 is a digitally-controlled, weighted voltage divider network shown within a block diagram designated by the general reference character 9. The net voltage signal $E_f$ appearing at the input amplifier terminal 4, with respect to ground, is dependent upon the weighted addition of the voltage divisions as determined in the network 9. As will be hereinafter described, the weighted voltage divider network 9 incorporates a plurality of switching circuits each individually and in combination having a unique designated weight. The switching circuits are individually and in combination placed in conductive and non-conductive states according to the sequences of received digital signals. The digital signals are supplied by a digital sequence generator 10 which follows a selected plan. Accordingly, each received set of digital signals contributes to the voltage signal $E_f$ by determining the condition of the network 9, such set of digital signals being provided by a digital sequence generator represented by the block diagram designated by the general reference character 10.

Figure 2:
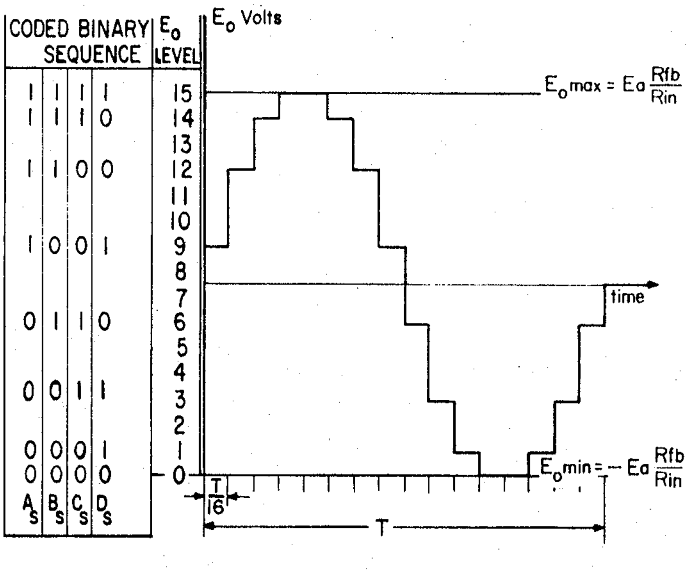
FIG. 2 is a graphical diagram of a digitally generated sinusoidal step-function waveform which may be produced with the multiplier of FIG. 1 when $E_a$ is a constant D.C. voltage. To the left of the waveform is a chart illustrating the binary sequence of the digital signals controlling the switches in the voltage divider network, and the corresponding output voltage level $E_o$.

The diagram of FIG. 2 illustrates a step-function, sinusoidal, output signal $E_o$. This signal is generated when a positive direct current voltage signal $E_a$ is received and the digitally-controlled, weighted voltage divider network 9 incorporates an array of four switching networks which are switched according to a binary code as illustrated by the chart to the left of the waveform in FIG. 2. It may be noted that by incorporating four various switches that sixteen unique output levels are realized by the switching network. The operational amplifier 2 has a high amplification factor so that the gain is dependent primarily on the ratio of the feedback resistor $R_{fb}$ and the input resistor $R_{in}$. The output signal is symmetrical about ground with the $E_o$ signal varying between $$\pm E_a \frac{R_{fb}}{R_{in}}$$

In the illustrated example each pulse is designated as having a width equivalent to 1/16 of the total time period (T) of the output signal. The weights of the various binary signals are such that the binary designation for a zero (0000) provides an $E_o$ of $$-E_a \frac{R_{fb}}{R_{in}}$$

and the binary designation for fifteen (1111) provides an $E_o$ of $$+E_a \frac{R_{fb}}{R_{in}}$$

When a zero level binary signal is received the voltage divider network 9 provides a minimum voltage $E_f$ and when a binary fifteen is received, $E_f$ is maximum. It may further be noted that by changing the binary coded sequence, other waveform shapes and frequencies may be realized.

Figure 3:
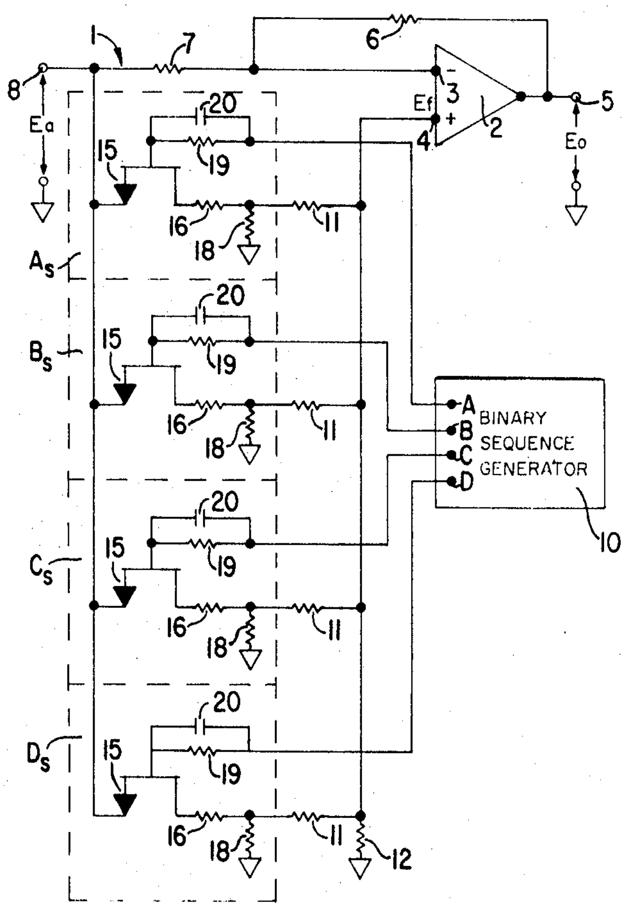
FIG. 3 is a wiring diagram of a digital-to-analogy, four-quadrant multiplier having sixteen levels and utilizing field effect transistors as electronic switches.

FIG. 3 illustrates a multiplier 1 having a digitally-controlled, weighted voltage divider network 9 comprising an array of four electronic switching circuits each illustrated within a broken-line block diagram designated $A_s$, $B_s$, $C_s$ and $D_s$ and a weighted adder network comprised of a set of four parallel resistors 11 and a resistor 12 extending from the junction of the resistors 11 to ground. The digital sequence generator 10 is illustrated in the form of a binary sequence generator having four output terminals A, B, C, and D, respectively tied to the switching circuits $A_s$, $B_s$, $C_s$ and $D_s$. The switching circuits $A_s$, $B_s$, $C_s$ and $D_s$ are in parallel. Each extends between the multiplier network input terminal 8 and the positive amplifier input terminal 4 through its respective adder network resistor 11.

In the network of FIG. 3, each of the switches comprises a field effect transistor (FET) 15. The source of each transistor 15 is tied to the input terminal 8. The drain of each transistor 15 extends to the amplifier input terminal 4 through a unique weighted voltage-divider array comprising two resistors 16 and 18 and the associated adder resistor 11. The voltage divider array is in the form of a T, with the resistors 11 and 16 forming the arm members and extending between the network input terminal 8 and the amplifier input terminal 4, and the resistor 18 forming the trunk branch and extending to the ground or reference plane. Each switch network has a control path including the gate of the respective FET 15 which joints a current limiting resistive component 19 extending to a respective terminal A, B, C or D of the binary sequence generator 10. The binary signals of the generator control the conductive and non-conductive state of the respective FET 15. A one bit places the respective transistor 15 in a conductive state such that a unique signal is contributed to $E_f$ and a zero bit places the transistor in a non-conductive state and provides no voltage component to $E_f$. In parallel with each of the resistors 19 is a capacitive component 20 which tends to accelerate the turning off of the respective FET 15 when an "off" signal follows an "on" signal from the generator 10. The net voltage between the input terminal 4 of the amplifier 2 and ground is dependent upon the weighted sum of the voltage components contributed by each switching circuit $A_s$–$D_s$. These values are, in turn, dependent upon the voltage divider arrangement and values of the resistors 16 and 18, and the weighting adder resistor 11 of each switching circuit.

The respective switching circuits $A_s$–$D_s$ are placed alternatively in conductive and non-conductive states according to the one or zero bit voltage levels received at their respective transistor gates. The bits appear across the respective output terminals A–D of the generator 10. For example, when the binary equivalent of zero level (0000) is received, a zero bit voltage level is produced across each of the output terminals A–D and ground of the generator 10, and all four of the FETs 15 remain in a non-conductive state. Accordingly, the input voltage $E_f$ to the operational amplifier 2 is a minimum, or zero, and the output voltage $E_o$ is $$\frac{-E_aR_6}{R_7}$$

As the binary equivalent of the various output levels are delivered by the generator 10, the switching circuits $A_s$–$D_s$ are placed in a conductive state individually and in combination. To further illustrate, when an $E_o$ level one is desired, a binary one (0001) is delivered and a one bit voltage level is received by the switching circuit $D_s$ and zero bit voltage levels by the circuits $A_s$, $B_s$, $C_s$. The one bit voltage level places the switching circuit $D_s$ in a conductive state while the switching circuits $A_s$, $B_s$, $C_s$ remain non-conductive. Due to the conductive state of the switching circuit $D_s$, a voltage is provided between the input terminal 4 of the amplifier 2 and the ground plane. This potential is unique due to the unique voltage division of the circuit $D_s$. As illustrated by the signal of FIG. 2, this potential is in opposite polarity to the potential provided by $$\frac{-E_aR_6}{R_7}$$

such that an output signal $E_o$ is provided which is more positive than for the zero level. When a binary three (0011) is received, it produces one bit voltage levels to both the $D_s$ and $C_s$ switching circuits such that the voltage across the input terminal 4 is dependent upon the weighted sum provided by the two conducting switching circuits. The voltage division and weighting due to the resistors 11, 16 and 18 of the switching circuit $C_s$ is unique from that of $D_s$. As illustrated, the switching circuit $C_s$ contributes approximately twice the voltage attributed to $D_s$ alone. Again referring to FIG. 2, it is apparent that a distinct level of output $E_o$ is provided by the concurrent conduction of $C_s$ and $D_s$. It may be appreciated that as the various other binary representations of the various levels are received, various other combinations of the switching circuit $A_s$–$D_s$ are respectively placed in a conductive and non-conductive state and coinciding output voltages are received to contribute to the $E_o$ waveform. When a binary fifteen is received, all switches $A_s$–$D_s$ conduct, the value of $E_f$ is maximum and as illustrated by FIG. 2, $$E_o=\frac{E_aR_6}{R_7}$$

Figure 4:
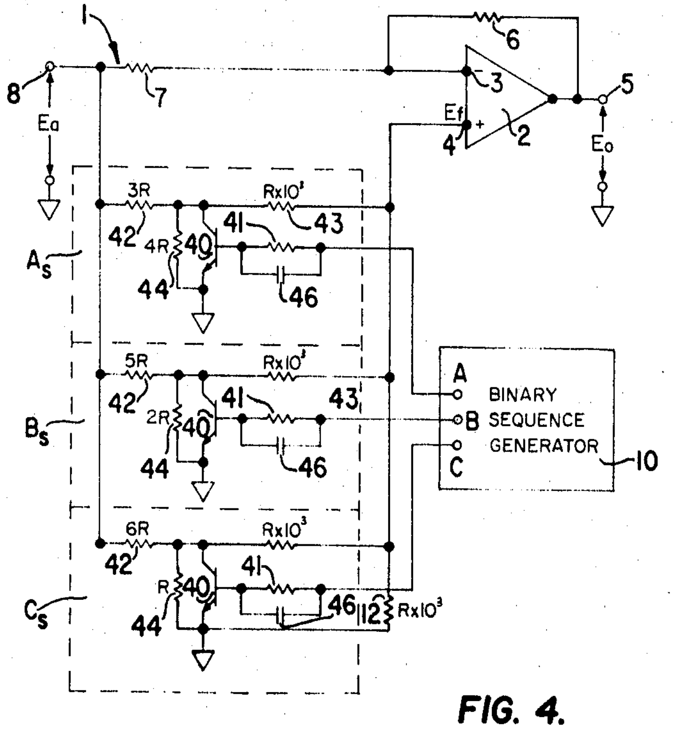
FIG. 4 is a wiring diagram of a digital-to-analog, four-quadrant multiplier having eight levels and utilizing transistors as electronic switches.
Figure 5:
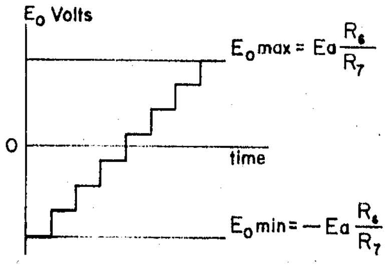
FIG. 5 is a graphical diagram of a digitally generated step-function ramp signal $E_o$ of the multiplier of FIG. 4, when $E_a$ is a constant D.C. voltage. To the left of the waveform is a chart illustrating the binary sequences of the digital signals controlling the switches of the voltage divider network to realize the ramp signal and the corresponding output levels $E_o$.

FIG. 4 illustrates a second embodiment of the present invention wherein the digitally-controlled, voltage divider network 9 incorporates transistors as electronic switches. FLG. 5 illustrates a step-function generated by the FIG. 5 network when the coded binary sequence follows that indicated by the chart of FIG. 5. The embodiment incorporates three switching circuits $A_s$, $B_s$ and $C_s$ such that eight levels may be realized. Those components which are similar to those of FIG. 3 carry the same reference numerals. Each switching circuit $A_s$, $B_s$ and $C_s$ includes an NPN transistor 40. The base of each transistor 40 extends through a current limiting resistor 41 to the respective A, B or C terminal of the binary sequence generator 10. The emitter of each transistor 40 is tied to the ground plane while each collector is tied to a unique weighted voltage-divider array comprising a resistor 42, a resistor 43 and a resistor 44. The voltage divider takes a T-shaped configuration with the arm branches comprising the resistors 42 and 43 extending between the network input terminal 8 and the amplifier input terminal 4 while the resistor 44 comprises the trunk branch and extends to the ground or reference plane in parallel with the collector-emitter of the transistor 40. In the arrangement of FIG. 4, it may be noted that the logic is in reverse to that of the network of FIG. 3. For example, to realize a minimum $E_o$ voltage of $$\frac{-E_aR_6}{R_7}$$

in FIG. 5, heretofore defined as the $E_o$ zero level, it is necessary the $E_f$ be a minimum. To realize a minimum $E_f$, it is necessary that the resistors 44 have a minimum potential drop. This is realized when all the transistors 40 are in a conductive state shorting the resistors 44. Thus, a binary sevel (111) is delivered by the binary sequence generator 10 in which a one bit voltage level appears across each of its terminals A, B, and C. The one bit voltage levels are, in turn, fed to the bases of the transistors 40 placing the transistors 40 each in a conductive state. This, in turn, places the collector at a minimum voltage and the sum of the voltage, $E_f$, supplied to the input terminal 4 at a minimum.

To further illustrate the reverse logic sequency of FIG. 4, when $$E_o=\frac{E_aR_6}{R_7}$$

a binary zero (000) is provided such that zero bit voltage levels are provided to each of the bases of the transistors 40. Under this condition, the transistors 40 are non-conductive and the collectors of each transistor are at a high potential. The sum $E_f$ of the potentials applied to the input terminal 4 of the amplifier 2 is a maximum coinciding with that necessary to realize $$E_o=\frac{E_aR_6}{R_7}$$

As is indicated, by charts of FIG. 5, the various other $E_o$ levels are in reverse order to that shown for the network of FIG. 3.

In FIG. 4, the weighting factor of each switching network is dependent upon the relative values of the resistors 42, 43 and 44. As shown the resistor 43 of each switching circuit $A_s$, $B_s$ and $C_s$ is equal while the resistors 42 and 44 differ, though the sum of the resistors 42 and 44 of each switching circuit is equal. The weighting factor of the switching circuit $A_s$ is $4/7$, while $B_s$ is $2/7$ and $C_s$ is $1/7$, making each unique and thus providing the step-function output $E_o$ dependent upon the switching sequence provided by the binary counter 10. Though, as illustrated, the resistors 43 are all of the same value they may be of differing values to provide unique voltage division in their respective switching circuits.

The networks of FIGS. 3 and 4, illustrate that $E_o$ is dependent upon the ratio of the feedback resistor $R_6$ across the amplifier 2 and the input resistor $R_7$. For an ideal operational amplifier, the individual values of the resistors $R_6$ and $R_7$ are irrelevant as to the amplifier operation and the ratio is the main concern. However, with actual amplifiers, especially inexpensive amplifiers, there may be an input offset current within the amplifier for which there must be compensation. To offset this current, it is advisable to make the impedance from the negative input terminal 3 to ground substantially equal to that appearing from the positive input terminal 4 to ground. In the illustrated circuit of FIG. 4, the input impedance at the terminal 4 is approximately 250R so that the net value of the parallel combination of $R_6$ and $R_7$ is preferably 250R. At the same time, the individual values of $R_6$ and $R_7$ may be selected so that the desired maximum and minimum $E_o$ are realized.

In the preceding discussion the circuit of FIG. 4 has been described in terms of voltage logic levels. The use of voltage logic levels is preferable when $E_a$ is a direct current voltage signal. If the $E_a$ voltage is an analog signal deviating between plus and minus values then it is advisable to utilize current logic levels to switch the transistors 40 into and out of a conductive state. These conditions may be easily realized by incorporating a current generator in series with each of the terminals A, B and C of the binary counter 10. Also, in certain applications it may be desirable to incorporate a speed-up capacitor 46 in parallel with each of the current limiting resistors 41.

Figure 6:
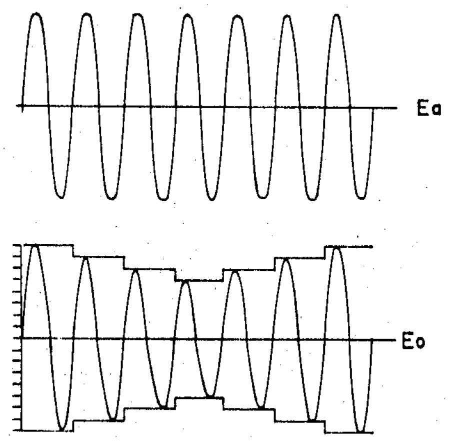
FIG. 6 illustrates the continuous analog input signal $E_a$ and the output envelope signal $E_o$ when the multiplier network is incorporated as a modulator.

Previously it has been mentioned that the $E_a$ input may be in the form of an alternating current signal such that the multiplying network 1 serves as a modulator. In FIG. 6 there is illustrated a sinusoidal $E_a$ signal. The figure further illustrates an $E_o$ output signal in the form of an amplitude modulated envelop, resulting from the modulation of $E_a$ according to the sequences of the binary coded signal delivered by the binary sequence generator to the digital control voltage divider network. The digital signals may be in the form of the information to be transmitted such that an amplitude modulated, digital step-function signal may be generated as illustrated.

We claim:

1. A digital-analog, four-quadrant multiplier network comprising, in combination:

network input terminal means for receiving an analog signal;

an operational amplifier having a pair of input terminals and an output terminal;

an input impedance path extending between the input terminal means and one of the amplifier input terminals;

a parallel feedback impedance path extending between said amplifier output terminal and the junction of the input impedance path and said one of the amplifier input terminals;

a digitally-controlled, weighted, voltage-divider network extending between the network input terminal means and the other of said amplifier input terminals, the divider network adapted to divide a signal across the network input terminal means and supply an input signal to the other of said amplifier input terminals of a magnitude coinciding with the instantaneous weight of the divider network;

generating means for generating a sequence of digital signals, said sequence coinciding with a selected plan, said generating means extending to the digitally-controlled, weighted voltage-divider network, the digital sequence controlling the instantaneous weight of the voltage divider network; whereby the instantaneous magnitude of an analog signal received at the amplifier input terminals is controlled by the digital sequence, and the output signal at the amplifier output terminal is dependent upon the multiplication of the analog signal and the digital sequence.

2. The digital-analog, four-quadrant multiplier network of claim 1 in which the digitally-controlled, weighted, voltage-divider network includes a plurality of switch circuits connected in parallel, each switch circuit extending between the network input terminal means and one of the amplifier input terminals, each switch circuit including a unique-weighted, voltage-divider array and having a control path extending to the generating means, said control path receiving a digital signal which signal controls the conductive state of the respective switch circuit; whereby each switch circuit individually and in combination provides a unique weighting factor to the signal applied to the amplifier dependent upon the switch circuit conductive state.

3. The digital-analog, four-quadrant multiplier network of claim 1 in which the generating means includes a binary sequence generator; and the digitally-controlled, weighted, voltage-divider network includes a plurality of solid-state switch circuits connected in parallel, each switch circuit extending between the network input terminal means and one of the amplifier input terminals, each of said switch circuits including a unique-weighted voltage-divider array and a control path extending to the generating means, said control path receiving from the generating means digital signals in the form of one bits and zero bits which bits control the conductive and non-conductive state of the respective switch circuit; whereby each switch circuit individually and in combination provides a unique weighting factor to the signal applied to the amplifier dependent upon the switch circuit conductive and non-conductive state.

4. The digital-analog, four-quadrant multiplier network of claim 1 in which the generator means includes a binary sequence generator; and the digitally-controlled, weighted voltage-divider network includes a plurality of solid-state switch circuits connected in parallel, each switch circuit including a field-effect transistor having a source, a drain and a base terminal with the source-drain terminals of each transistor extending between the network input terminal means and the amplifier input terminals through a unique-weighted, voltage-divider array, the base terminal of each field effect transistor extending to the generating means, said base receiving from the generating means digital signals in the form of one bits and zero bits which bits control the conductive and non-conductive state of the respective transistor; whereby each switch circuit individually and in combination provides a unique weighting factor to the signal applied to the amplifier dependent upon the switch circuit conductive and non-conductive state.

5. The digital-analog, four-quadrant multiplier network of claim 4 in which the unique-weighted, voltage-divider array of each switch circuit comprises three branches of resistive elements connected in a T-shaped configuration, with the branches comprising the arms of the T extending between the drain of the associated transistor and the amplifier input terminals, and the trunk branch of the T extending to a reference plane; the net resistive value of each array of each switch being unique in respect to the other arrays.

6. The digital-analog, four-quadrant multiplier network of claim 1 in which the generating means includes a binary sequence generator, the digitally-controlled, weighted, voltage-divider network includes a plurality of solid-state switch circuits connected in parallel, each switch circuit including a unique, weighted, voltage-divider array and a transistor having an emitter, a collector and a base terminal, each voltage-divider array extending between the network input terminal means and the amplifier input terminals and the collector-emitter terminals of each of said transistors extending between a respective voltage-divider array and a reference plane, the base terminal of each of said transistors extending to hte generating means, each of said bases receiving from the generating means digital signals in the form of one bits and zero bits which bits control the conductive and non-conductive state of the respective transistor; whereby each switch circuit individually and in combination provides a unique weighting factor to the signal applied to the amplifier dependent upon the switch circuit conductive and non-conductive state.

7. The digital-analog, four-quadrant multiplier network of claim 6 in which the unique-weighed, voltage-divider array of each switch circuit comprises three branches of resistive elements connected in a T-shaped configuration with the branches comprising the arms of the T extending between the network input terminal means and the amplifier input terminals, and the trunk branch extending to a reference plane in parallel with the collector-emitter terminals of said transistor.

8. In a digital-analog multiplier the combination comprising:

an operational amplifier having a pair of input terminals and an output;

circuit input connections for receiving an analog signal;

an input impedance path joining said circuit input connections with a first of said operational amplifier input terminals;

a voltage divider network connected between said circuit input connections and the second of said operational amplifier input terminals, such voltage divider network thereby having an analog signal appearing at the circuit input connections applied thereto;

said voltage divider network having a plurality of electronic switches each with associated resistances that provide a voltage component to the second of said operational amplifier input terminals; and a binary signal source joined to said electronic switches that provides a set of binary signals for operation of the switches.

9. A device as in claim 8 having a feedback impedance connected across the output and the first of said input terminals of said operational amplifier.

References Cited

UNITED STATES PATENTS

| | | | |
|---|---|---|---|
| 2,966,302 | 12/1960 | Woolf et al. | 235—194 X |
| 3,146,343 | 8/1964 | Young | 235—150.52 X |
| 3,177,350 | 4/1965 | Abbott et al. | 235—194 X |
| 3,348,031 | 10/1967 | Russell et al. | 235—150.5 |

MALCOLM A. MORRISON, Primary Examiner

J. F. RUGGIERO, Assistant Examiner

U.S. Cl. X.R.

235—194